United States Patent [19]

Fintel

[11] Patent Number: 4,919,872
[45] Date of Patent: Apr. 24, 1990

[54] PROCESS FOR METERING COLOR CONCENTRATES TO THERMOPLASTIC POLYMER MELTS

[75] Inventor: William A. Fintel, Lewes, Del.

[73] Assignee: E. I. Du Pont de Nemours and Company, Wilmington, Del.

[21] Appl. No.: 311,515

[22] Filed: Feb. 16, 1989

Related U.S. Application Data

[62] Division of Ser. No. 186,010, Apr. 25, 1988, Pat. No. 4,848,915.

[51] Int. Cl.⁵ .............................................. B29C 47/92
[52] U.S. Cl. ..................................... 264/103; 264/40.1; 264/40.7; 264/143; 264/210.6; 264/211.14
[58] Field of Search ................. 264/210.6, 40.1, 40.7, 264/103, 140, 143, 211.14; 425/135

[56] References Cited

U.S. PATENT DOCUMENTS

| | | | |
|---|---|---|---|
| 2,581,922 | 1/1952 | Spencer | 425/71 |
| 2,838,792 | 6/1958 | Keight et al. | 264/349 |
| 2,947,030 | 8/1960 | Varn | 366/76 |
| 3,030,330 | 4/1962 | Cines et al. | 264/349 |
| 3,148,412 | 9/1964 | Spreeuwers | 264/349 |
| 3,155,750 | 11/1964 | Dahn, Jr. et al. | 264/40.7 |
| 3,304,282 | 2/1967 | Cadus et al. | 264/349 |
| 3,664,782 | 5/1972 | Nevin | 425/198 |
| 3,732,345 | 5/1973 | Amos et al. | 264/349 |
| 4,101,613 | 7/1978 | Norwood | 264/40.7 |
| 4,175,870 | 11/1979 | Warzel | 366/79 X |
| 4,353,851 | 10/1982 | Godfrey et al. | 264/140 X |
| 4,728,475 | 3/1988 | Beck | 366/76 X |
| 4,770,539 | 9/1988 | Heathe | 366/76 X |

FOREIGN PATENT DOCUMENTS

| | | | |
|---|---|---|---|
| 57-08139 | 1/1982 | Japan | 264/349 |
| 1119199 | 7/1968 | United Kingdom | |

*Primary Examiner*—Jeffery Thurlow

[57] ABSTRACT

Continuous strands of color concentrate are metered into the feed zone of a screw-melter polymer extruder where they are cut into pellets by the shearing action of the flights of a rotating screw against the extruder housing. These pellets are mixed within the extruder with a thermoplastic polymer to be colored and this mixture is then melted and extruded into a useful article, for example, a fiber for textile or carpeting end-use.

Additionally, color concentrates can be first formed into continuous strands and stored conveniently on a spool for subsequent metering into the polymer extruder.

1 Claim, 5 Drawing Sheets

PROCESS FOR METERING COLOR CONCENTRATES TO THERMOPLASTIC POLYMER MELTS

This is a division of application Ser. No. 186,010, filed Apr. 25, 1988, now U.S. Pat. No. 4,848,915, issued July 18, 1989.

BACKGROUND

This invention relates generally to a process for the introduction of additives into a melt extruder. More particularly it relates to the addition of color concentrates into a carrier polymer being processed in a melt extruder.

Thermoplastic polymers are often colored in the molten state by the addition of color concentrates. Color concentrates are concentrated dispersions of a colorant in a carrier polymer, the carrier polymer being either the same as or compatible with the polymer to be colored. There are several known methods for adding a color concentrate to a thermoplastic polymer.

One method is to meter a pelletized color concentrate into the throat of a polymer extruder using either volumetric or gravimetric pellet feeders. The volumetric system lacks sufficient precision for good color uniformity of the resulting polymer. Gravimetric feeders, while an improvement over volumetric feeders for color uniformity, are mechanically complicated and thereby both costly and difficult to maintain precise control.

Another known method of adding color concentrates to a thermoplastic polymer is to first melt the concentrate and then meter the molten concentrate into a melt of the thermoplastic polymer. This method provides for precise metering of the concentrate into the thermoplastic polymer thereby resulting in good color uniformity. However, the cost of melt addition equipment is high and achieving satisfactory levels of dispersion of color concentrate is sometimes difficult.

It is also known from GB 1,119,199 to meter color concentrates in a strand form to a rotary cutter located adjacent to the throat of an extruder. The rotary cutter forms pellets from the color concentrate which enter the extruder to mix with a thermoplastic polymer. This method aids somewhat in precise metering of pellets into an extruder; however, it still involves a modification of the color concentrate before it is added to the extruder.

In the known methods for adding color concentrates to thermoplastic polymers, it is always necessary to modify the color concentrate either by heating it to a molten state or by cutting it into pellet form.

SUMMARY OF THE INVENTION

This invention provides an improved process for adding color concentrates to thermoplastic polymers being processed in screw-melter extruders. The improvement comprises feeding the color concentrate as a continuous strand into an inlet to the extruder barrel and subsequently shearing the strand into pellet form by the action of the extruder screw against an edge formed in the barrel surface by the inlet to the extruder barrel.

This invention also includes melt extruding the color concentrate as a continuous strand, then winding the strand on a spool.

DETAILED DESCRIPTION OF THE ILLUSTRATED EMBODIMENTS

In accordance with this invention, continuous strands of color concentrate are metered into the feed zone of a screw-melter polymer extruder where they are cut into pellets by the shearing action of the flights of a rotating screw against the extruder housing. These pellets are mixed within the extruder with a thermoplastic polymer to be colored and this mixture is then melted and extruded into a useful article, for example, a fiber for textile or carpeting end-use.

Additionally, color concentrates can be first formed into continuous strands and stored conveniently on a spool for subsequent metering into the polymer extruder.

Screw-melter polymer extruders useful in this invention are of the single or twin-screw type. These extruders typically have a barrel housing with a rotatable screw longitudinally positioned therein for the purpose of moving a thermoplastic polymer flake or pellet from the feed zone into the melting zone of the extruder. The screw comprises a shaft rotatably mounted longitudinally within the housing and having a flight positioned spirally about and projecting from the surface of the shaft to a location touching the wall of the barrel housing. In operation the flight wipes the inner surface of the barrel. In accordance with this invention, color concentrate in continuous strand form is fed through an opening in the extruder housing where the flight located on the rotating shaft contacts the strand and shears it between the edge of the flight and the barrel housing in the area of the strand entry as will be explained more fully hereinbelow.

Figure 1:
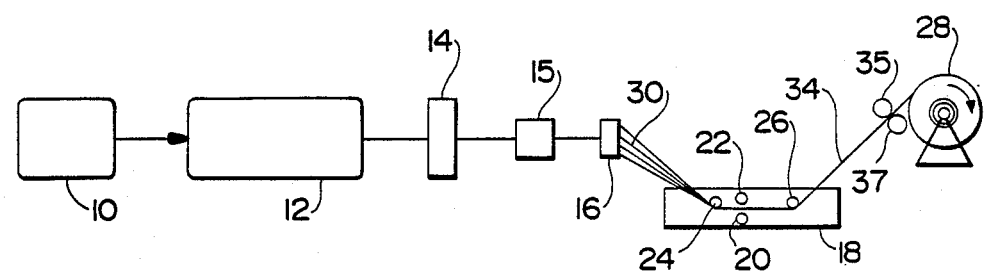
FIG. 1 is a schematic diagram that illustrates a process for forming the color concentrates as a strand wound on a spool.

FIG. 1 shows a process for making a continuous strand color concentrate useful in this invention. A coloring material, such as a pigment, is compounded with a thermoplastic polymer, such as nylon or polyethylene, in an intermixer 10, for example, a Banbury mixer. A batch of compounded color concentrate is thoroughly blended and then transferred to and melted in an extruder 12 from which it can be passed through a screen filter 14 to remove agglomerates of color concentrate. Meter pump 15 then transfers the melt to extrusion die 16 from which color concentrate strands 30 are extruded. Individual strands 30 pass through quench bath 18 and are guided by pins 24, 26 and form a single multi-strand cable 34 of color concentrate. The cable 34 is precisely metered by nip rolls 35, 37 to maintain weight per unit length at a constant value and is then wound up on spool 28. Controlling the weight per unit length of the color concentrate cable is important in ensuring good color uniformity of the thermoplastic polymers to be colored. While rolls 35, 37 can be smooth, they may be knurled or toothed to facilitate precise metering of the cable. The strand and subsequent cable diameters are optimized for flexibility to ensure windability on the spool. The spool 28 can later be used to provide a continuous color concentrate cable to a polymer coloring process. As cable 34 is passed through quench bath 18, guide rolls 22, 20 may be used to press the individual color concentrate strands together while still tacky, thereby improving the cohesiveness of the strands in cable 34. Although rolls 22, 20 can be smooth, they may be knurled or toothed to facilitate the tacking together of the strands which pass betweem them.

In addition to the multi-strand cable process described above, it may be possible with relatively flexible color concentrates or with relatively narrow diameter strands to extrude a single-strand and wind this strand onto a spool for later use.

Figure 2:
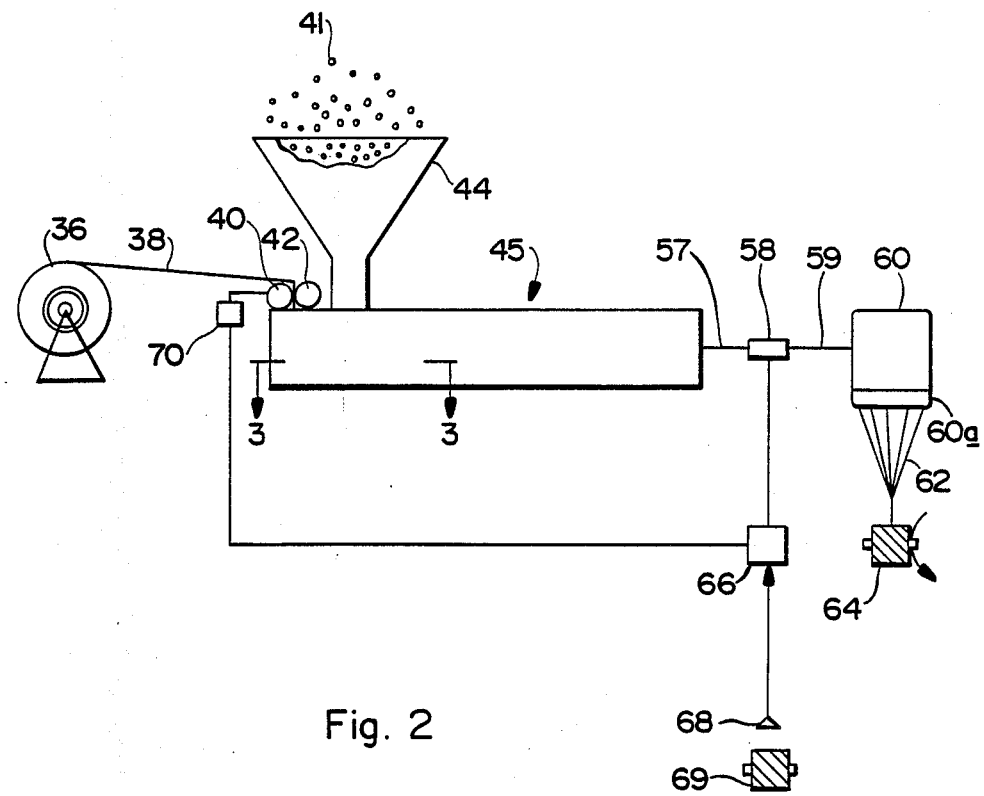
FIG. 2 is a schematic diagram that illustrates a process for metering color concentrates as a strand from a spool into a screw-melter extruder.
Figure 4:
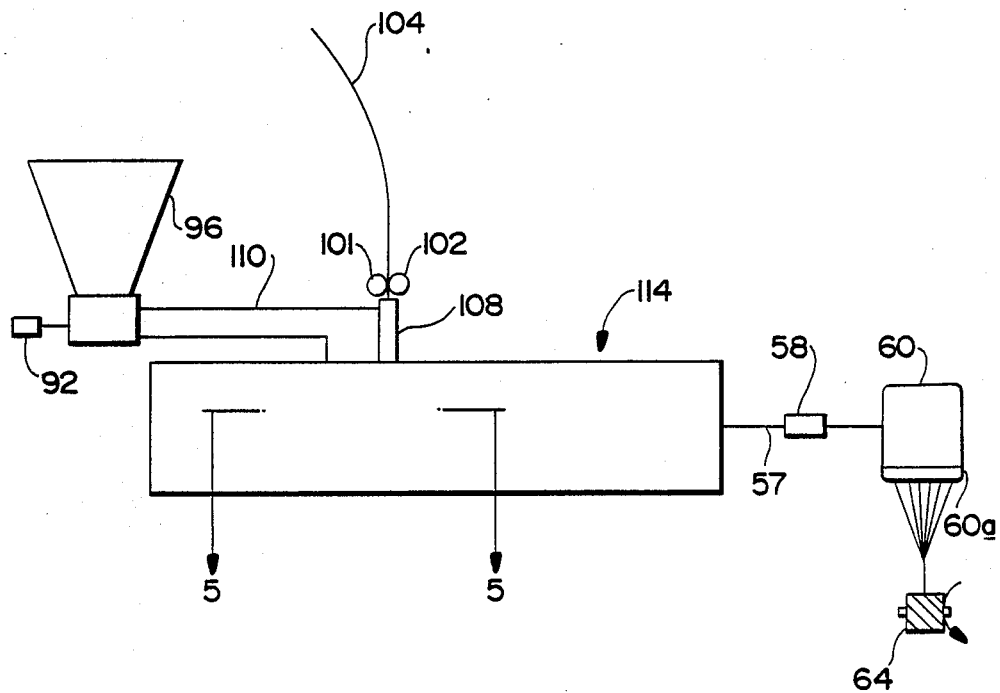
FIG. 4 is a schematic diagram that illustrates another embodiment of a process for adding color concentrates as a strand from a spool into a screw-melter extruder.

FIGS. 2 and 4 depict alternate embodiments for addition of a continuous cable of color concentrate to a thermoplastic polymer. In either embodiment, it is important that the color concentrate strand be introduced into the feed zone of the extruder where it can be sheared between the rotating screw flights and the inner surface of the barrel. The color concentrate, when being introduced into the extruder, must have a degree of brittleness to enable the color concentrate to be clearly sheared into pellets. The feed zone of an extruder is typically that section of an extruder into which polymer flake, color concentrate or additional components are added prior to melt.

In FIG. 2 a thermoplastic polymer flake 41 is loaded into hopper 44 which flood-feeds a conventional single-screw screw-melter extruder. Color concentrate 38 in single strand or multi-strand form is fed from spool 36 into the feed zone of extruder 45 via metering rolls 40, 42. Within extruder 45, the color concentrate is sheared into pellets as will be described hereinbelow and subsequently co-mixed and co-melted with a thermoplastic polymer to be colored. After extrusion into transfer line 57, this colored polymer is metered by meter pump 58 through transfer line 59 to spin pack 60 having spinneret 60a and extruded as individual filaments 62 and subsequently collected as a multi-filament strand on bobbin 64. The multi-filament strand is useful in textile or carpet applications.

Addition of color concentrate by rolls 40, 42 can be controlled by monitoring the output of meter pump 58 alone or in combination with the color of strands on bobbin 64. A controller 66, such as a programmable logic controller (Model No. 5-15 by Allen Bradley), receives motor speed signals from meter pump 58. Controller 66 signals motor control drive 70 (such as Model No. 1332 by Allen Bradley) to subsequently control the speed of rolls 40, 42. If controller 66 senses a meter pump change in throughput, it will signal motor controller 70 to proportionately change the speeds of rolls 40, 42. In addition, off-line color monitor 68 (such as Model No. 1800 by Applied Color Systems) can be used to indicate high or low color concentration levels in the strands of recently wound bobbin 69. If color monitor 68 indicates an above limit amount of color concentrate, controller 66 can be signaled to decrease meter roll speeds 40, 42. Conversely, if color monitor 68 indicates a low amount of color concentrate, then controller 66 can be signaled to increase the speeds of rolls 40, 42. By controlling the speeds of metering feed rolls 40, 42 according to one or more downstream process conditions, a product having excellent color uniformity can be achieved.

Figure 3:
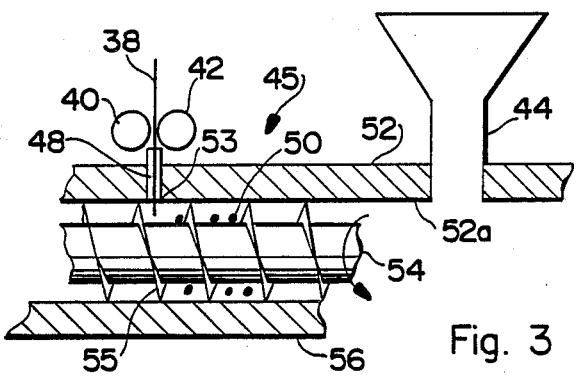
FIG. 3 is an enlarged cross-sectioned portion of FIG. 2 taken through the line 3—3 of FIG. 2 showing the addition of color concentrate into a single-screw screw-melter extruder.

FIG. 3 in a sectioned view through line 3—3 of FIG. 2 shows the infeed of color concentrate 38 into extruder 45. Color concentrate 38 is metered into extruder 45 by rolls 40, 42. Color concentrate 38 enters extruder 45 by passing through guide tube 48. Guide tube 48 guides the color concentrate through the wall 52 of the extruder barrel. Guide tube 48 can be of various lengths, thereby enabling rolls 40, 42 to be located at some distance from the wall 52 of extruder 45. When rolls 40, 42 are located away from extruder 45, guide tube 48 keeps the color concentrate from buckling as it enters the extruder. The addition of inert gas to the guide tube can be done to purge it of oxygen if desired. As color concentrate 38 enters extruder 45, the color concentrate is sheared between the spiraled flight 55 of turning screw 54 and the edge 53 formed by intersection of the inner surface 52a of barrel 52 with inlet 48, resulting in color concentrate particles 50. The shearing surfaces 53, 55 would normally be hardened for use by known techniques of heating or coating.

Figure 5:
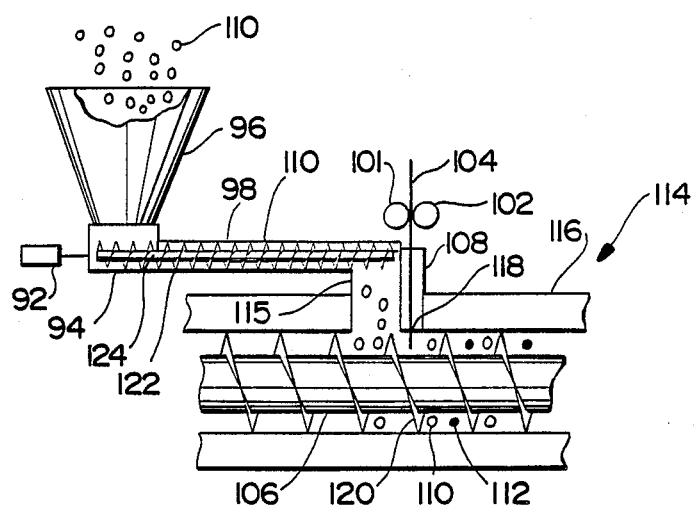
FIG. 5 is an enlarged cross-sectioned portion of FIG. 4 taken along line 5—5 of FIG. 4 showing another embodiment of the invention.

FIGS. 4 and 5 are illustrative of another embodiment showing the addition of color concentrate 104 into extruder 114 which is a typical dual-screw screw-melter extruder apparatus. Color concentrate 104 is metered by rolls 101, 102 into extruder 114 through guide tube 108. As color concentrate 104 enters extruder 114, the color concentrate is sheared between the flight 120 of turning screw 106 and barrel housing edge 118 resulting in color concentrate particles 112. Simultaneously with color concentrate addition, thermoplastic polymer flake 110 is starve fed into extruder 114 by the action of turning auger 124 having spiraled flight 122 carrying flake from hopper 96 and distribution box 94 along tube 98 where it is then deposited into extruder 114 through supply tube 115. Auger 124 is powered by motor 92.

Figure 6:
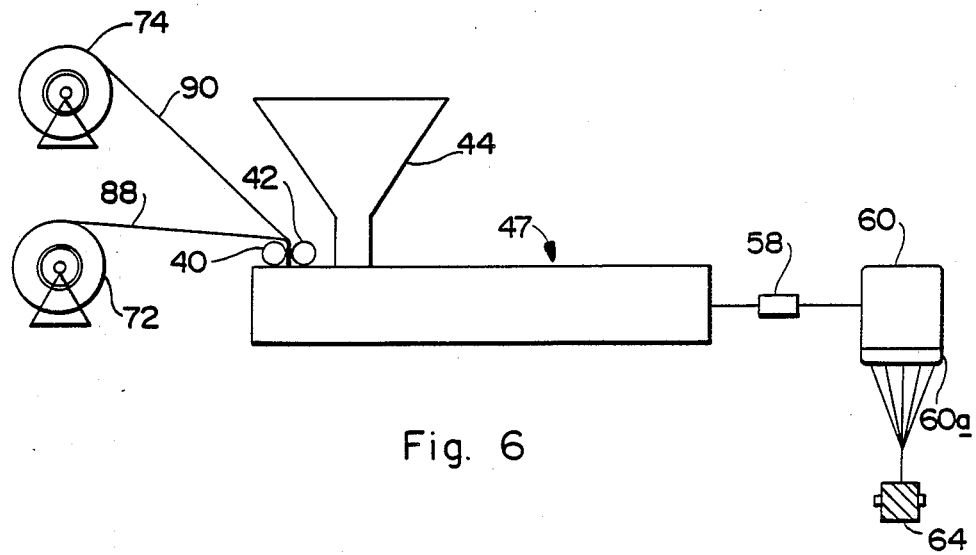
FIG. 6 is a schematic diagram that illustrates the simultaneous addition of multiple color concentrates into a process for coloring thermoplastic polymers.

FIG. 6 shows an alternate embodiment in which a plurality of individual color concentrates in the form of strands or cables are fed together into an extruder. Color concentrates 88, 90 are fed from spools 72, 74 and metered together by rolls 40, 42 into extruder 47. Thermoplastic polymer is placed in the hopper 44 from which it enters extruder 47 and is co-mixed with the color concentrate. After extrusion, meter pump 58 meters the colored polymer to spinneret 60a where it is subsequently extruded as multifilaments and collected as a multifilament strand on bobbin 64.

The colored thermoplastic polymers produced as described herein have many uses, particularly as synthetic fibers for the textile and carpet industry.

In general, the process described herein provides color concentrates in a convenient form for use in many methods of manufacture for thermoplastic polymer material, including extrusion processes as described above as well as moldings, blow-moldings and the like wherein uncolored thermoplastics are pre-mixed or mixed with color concentrates prior to article formation.

Figure 7:
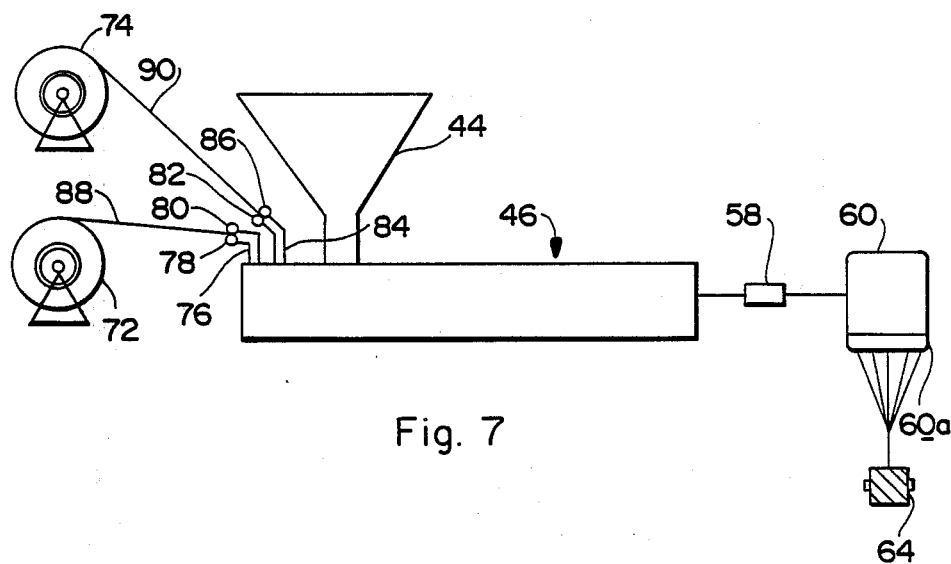
FIG. 7 is a schematic diagram that illustrates the separate addition of multiple color concentrates into a process for coloring thermoplastic polymers.

FIG. 7 shows a process wherein a plurality of color concentrates are metered in strand or cable form into an extruder. Color concentrates 88, 90 are taken from spools 72, 74 and metered by rolls 78, 80 and 82, 86 through guide tubes 76, 84 into extruder 46. A thermoplastic polymer is placed in hopper 44 and subsequently delivered into extruder 46 where it is mixed with the color concentrates. The extruded colored polymer is metered by meter pump 58 to spinneret 60a where it is extruded as multiple filaments and wound up as a multifilament strand on bobbin 64. Color concentrate 88, 90 can be of different colors. Additional bobbins and color concentrates could be added in conjunction with those shown. The addition of multiple colors of concentrates conveniently results in high versatility in the selection and fine adjustment of colors for the thermoplastic polymers. Individual metering of the multiple ends of color concentrate further aids the adjustment of color in the thermoplastic polymer.

What is claimed:

1. In a process for forming a color concentrate including the steps of compounding a pigment with a thermoplastic polymer melting said compounded material and extruding said melted compounded material as a continuous strand, the improvement comprising: winding said continuous strand in a constant weight-per-unit-length ratio onto a spool after extrusion.

* * * * *